(12) United States Patent  
Reddy

(10) Patent No.: US 6,479,970 B2
(45) Date of Patent: Nov. 12, 2002

(54) UN-INTERRUPTIBLE POWER SUPPLY

(76) Inventor: Anantha B. Reddy, 17183 Russet St., San Diego, CA (US) 92127

(*) Notice: Subject to any disclaimer, the term of this patent is extended or adjusted under 35 U.S.C. 154(b) by 0 days.

(21) Appl. No.: 09/825,475

(22) Filed: Apr. 3, 2001

(65) Prior Publication Data

US 2002/0140403 A1 Oct. 3, 2002

(51) Int. Cl.[7] .................................................. H02J 7/00
(52) U.S. Cl. ........................................ 320/162; 307/66
(58) Field of Search ................. 320/162; 307/66, 307/149, 46

(56) References Cited

U.S. PATENT DOCUMENTS 5,440,179 A * 8/1995 Severinsky .................. 307/64
6,157,168 A * 12/2000 Malik .......................... 307/66
6,218,744 B1 * 4/2001 Zahrte et al. ................ 307/64

* cited by examiner

*Primary Examiner*—Gregory Toatley
(74) *Attorney, Agent, or Firm*—James F. Kirk

(57) ABSTRACT

An un-interruptible power supply coupled to a dc input voltage node, having a mode control circuit to monitors the input voltage and to provide a mode selection signal to indicate that the input voltage is above a predetermined level. A high frequency transformer has a primary winding, an output winding and a charger winding. A battery is referenced to a third reference potential node. An input inverter transfers power from the dc input voltage to an output rectifier and to an adaptive converter to charge a battery. The output rectifier and filter provides the output dc voltage referenced to the second reference potential node. The adaptive converter referenced to the third reference potential transfer power from the battery to the transformer charger winding to provide the output dc voltage source.

18 Claims, 13 Drawing Sheets

|  | ON | OFF |
|---|---|---|
| STATE 1: | 1;4 | 2,3 |
| STATE 2: |  | 1;2;3;4 |
| STATE 3: | 2;3 | 1;4 |

FIG. 8

FIG. 9 — TIME

INPUT INVERTER CONTROL SCHEMATIC

BATTERY INVERTER CONTROL SCHEMATIC

UN-INTERRUPTIBLE POWER SUPPLY

FIELD OF INVENTION

This invention relates to the field of power supplies or power converters and more particularly to on-line, isolated solid state sources with battery back up in which the input, the output, and battery voltages are significantly different.

BACKGROUND OF THE INVENTION

FIGS. 1 and 2 show related designs of isolated un-interruptible power supplies with battery back up in which two transformers are used to achieve isolation. In the circuit of FIG. 1, ac input voltage from an external mains source is rectified by a function represented by the FIRST CONVERTER BRIDGE RECTIFIER block and filtered by a function represented by the FIRST L/F FILTER block, a low frequency filter. A first high frequency inverter represented by the FIRST H/F INVERTER block uses a first transformer T1 to provide power via a high frequency rectifier represented by a H/F RECTIFIER block and H/F FILTER to a battery charging bus identified as BATT. A low frequency inverter represented by the L/F INVERTER block uses a second transformer T2 to provide sinusoidal power to the load via a second low frequency filter represented by SECOND L/F FILTER block. The second transformer T2 provides galvanic isolation from the load to the battery and the low frequency inverter. Since the output power from the second transformer T2 is at the output line frequency of 50–60 Hz, the second transformer is large and heavy.

The isolated un-interruptible power supply of FIG. 2 uses a first high frequency inverter represented by the H/F INVERTER block to drive a first transformer T3. The secondary of transformer T3 provides power via the FIRST H/F RECTIFIER and H/F FILTER blocks to a battery charging buss designated by the legend BATT. Power is provided from the BATT buss to a second high frequency inverter represented by the SECOND H/F INVERTER block. The battery clamps or limits the voltage on the BATT buss. The secondary of T4 drives a high frequency rectifier and filter to provide one or more high voltage rails. Transformer T4 is a small and light high frequency component.

The function represented by the L/F INVERTER block of FIG. 2 produces a 60 Hz output source of power using a solid state dc-to-ac drive. The L/F INVERTER provides the 60 Hz output by pulse width modulating power off the dc rails from the H/F RECTIFIER & FILTER, through an inductor within the L/F INVERTER. The function represented by the L/F INVERTER block copies the required sinusoidal waveform without regard to the current required, subject to the instantaneous current required at any time remaining within predetermined limits.

The circuit of FIG. 2 offers a saving over the circuit of FIG. 1 in that the first circuit uses a low frequency second transformer T2 and the circuit of FIG. 2 uses a high frequency second transformer T4 which would be smaller and lighter for an equivalent power output capability. Both circuits have a low frequency inverter which has at least one inductor (not shown).

Some on-line sources use a larger stack of batteries to form a high voltage battery bus to eliminate the need for a separate boost section to boost the battery stack voltage up Some on-line sources use a larger stack of batteries to form a high voltage battery bus to eliminate the need for a separate boost section to boost the battery stack voltage up to the dc rail voltages which might be +/−200 Vdc. The battery voltage can be directly used to feed the critical load.

However, a smaller battery stack with a lower battery bus voltage, i.e. 48 Vdc. The lower battery bus is believed to be preferred because a battery stack with fewer cell s in series is believed to be more reliable and more easily maintained.

The systems of FIGS. 1 and 2 are continuous on-line system that keeps the batteries connected while operating, and pass the total power consumed including battery charging power, through the first transformer T1 or T3. Load power alone flows through the second transformer T2, or T4. The combined power, passing through the T1 or T3 transformer, increases the required power rating for the first transformer. The volume of the two input transformers as well as their size and weight exceed the volume, size and weight of the single transformer required for the single transformer used in the subject invention.

BRIEF SUMMARY OF THE INVENTION

The invention, UN-INTERRUPTIBLE POWER SUPPLY (UPS) reduces the system cost, volume, and weight by using a single three winding high frequency power transformer instead of the two transformers used by conventional systems. Input, output and battery sections are respectively connected via the three power windings of the high frequency transformer isolating the sections from each other and establishing galvanic isolation between the output load and the input power source.

FIG. 3 shows the invention un-interruptible power supply within phantom block 10. 50–60 Hz ac Mains power from voltage source 12 is applied at input terminals 14 of I/P FILTER (input power filter) 16. The I/P FILTER 16 filters and passes the power to rectifier 18 providing unregulated and unfiltered dc voltage to a low-pass filter 20. The output of the low-pass filter 20 is an unregulated dc source 22 that is coupled to the input 24 of the INPUT INVERTER 26 which typically uses an H-Bridge inverter circuit to drive the primary winding N1 of transformer T5. The combination of elements within phantom box 28 is represented as a dc voltage source 22 at input inverter input 24 in FIGS. 4, 5 and 6.

BRIEF DESCRIPTION OF THE SEVERAL VIEWS OF THE DRAWING

FIG. 8 is a state table for the four states of the timing diagrams of FIG. 7 and FIG. 9;

DETAILED DESCRIPTION OF THE INVENTION

Figure 1:
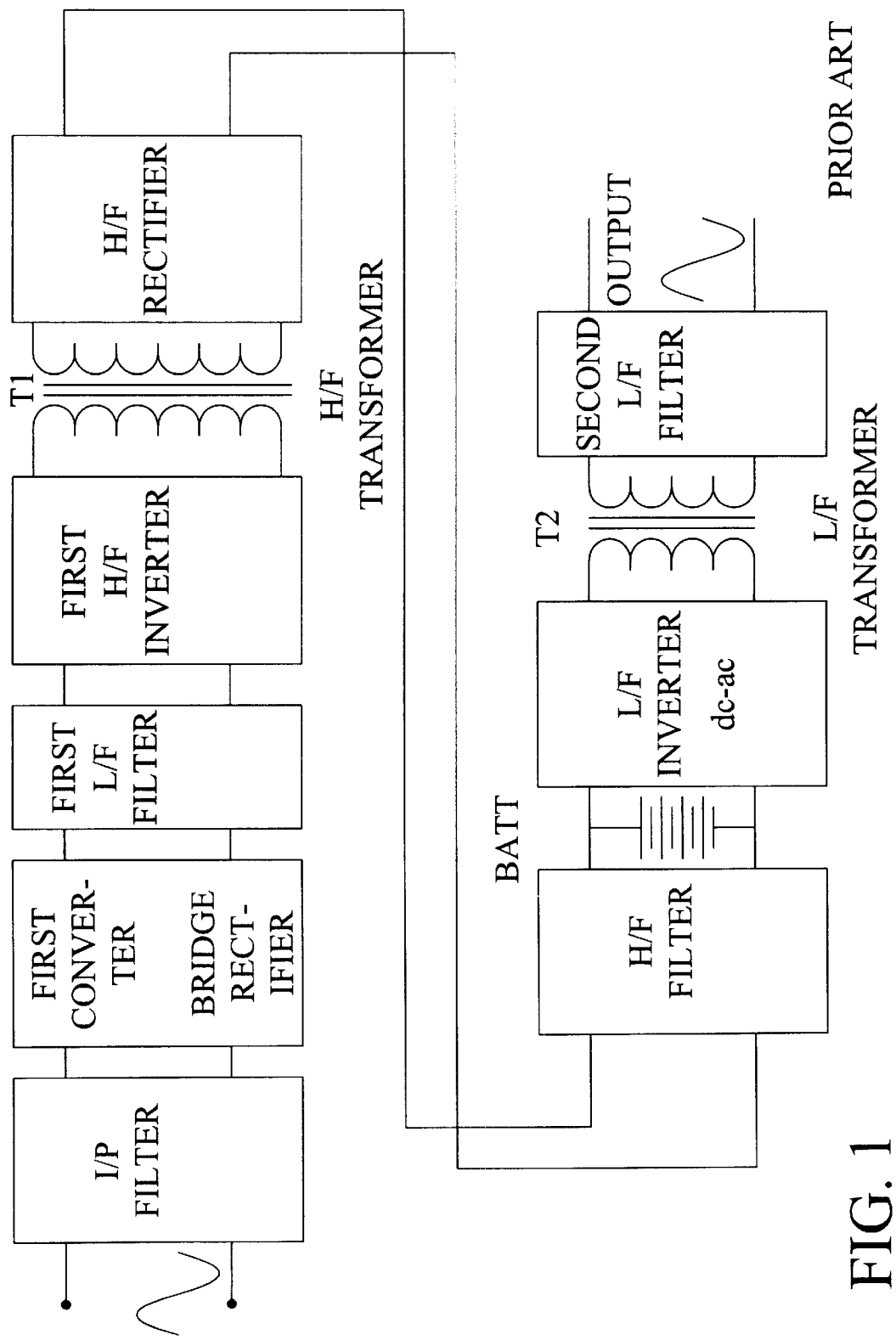
FIG. 1 is a block diagram of a two transformer UN-INTERRUPTIBLE POWER SUPPLY(UPS) using a high and a low frequency power transformer.
Figure 2:
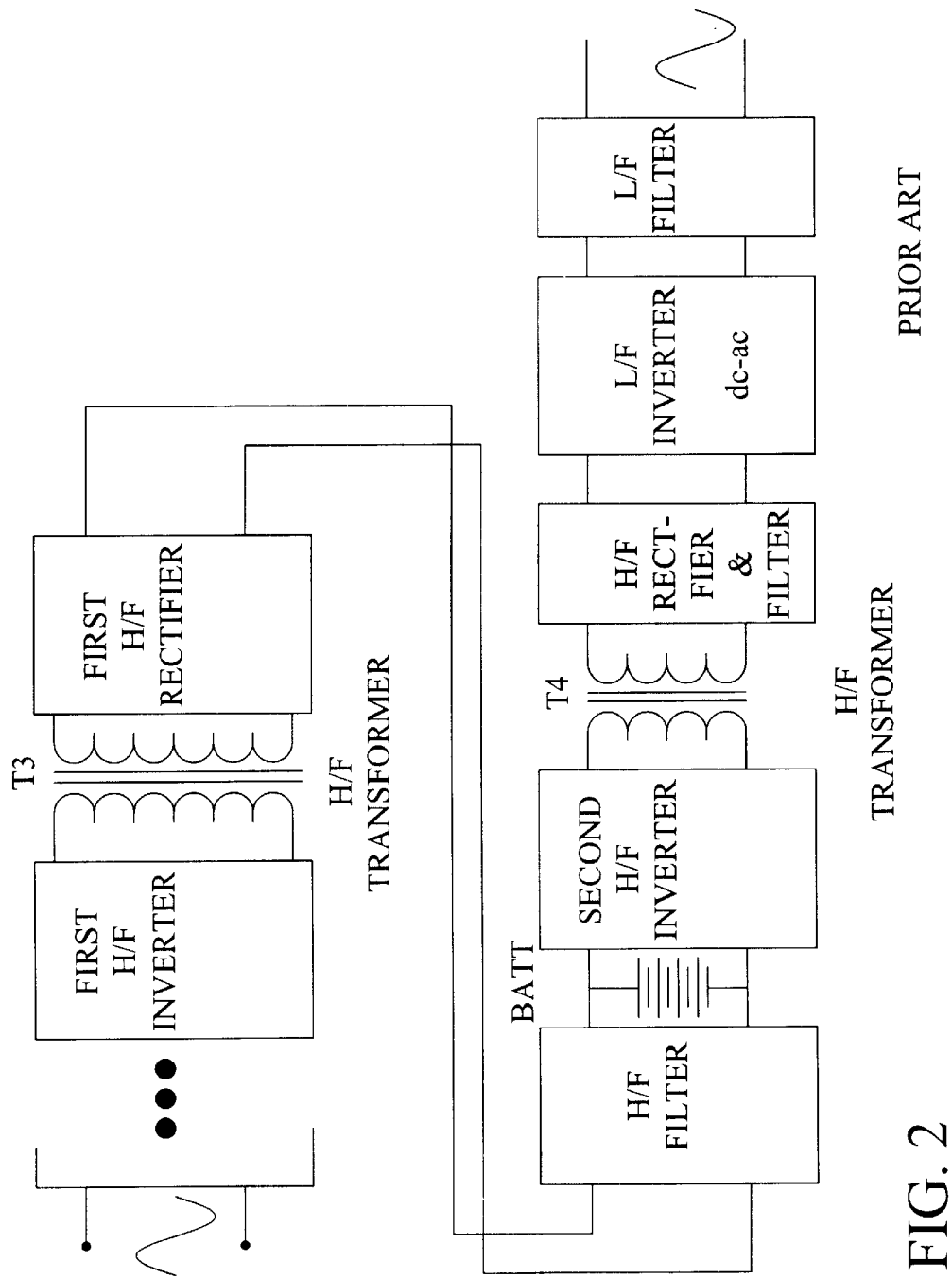
FIG. 2 is a block diagram of a second style of two transformer UN-INTERRUPTIBLE POWER SUPPLY (UPS)
Figure 3:
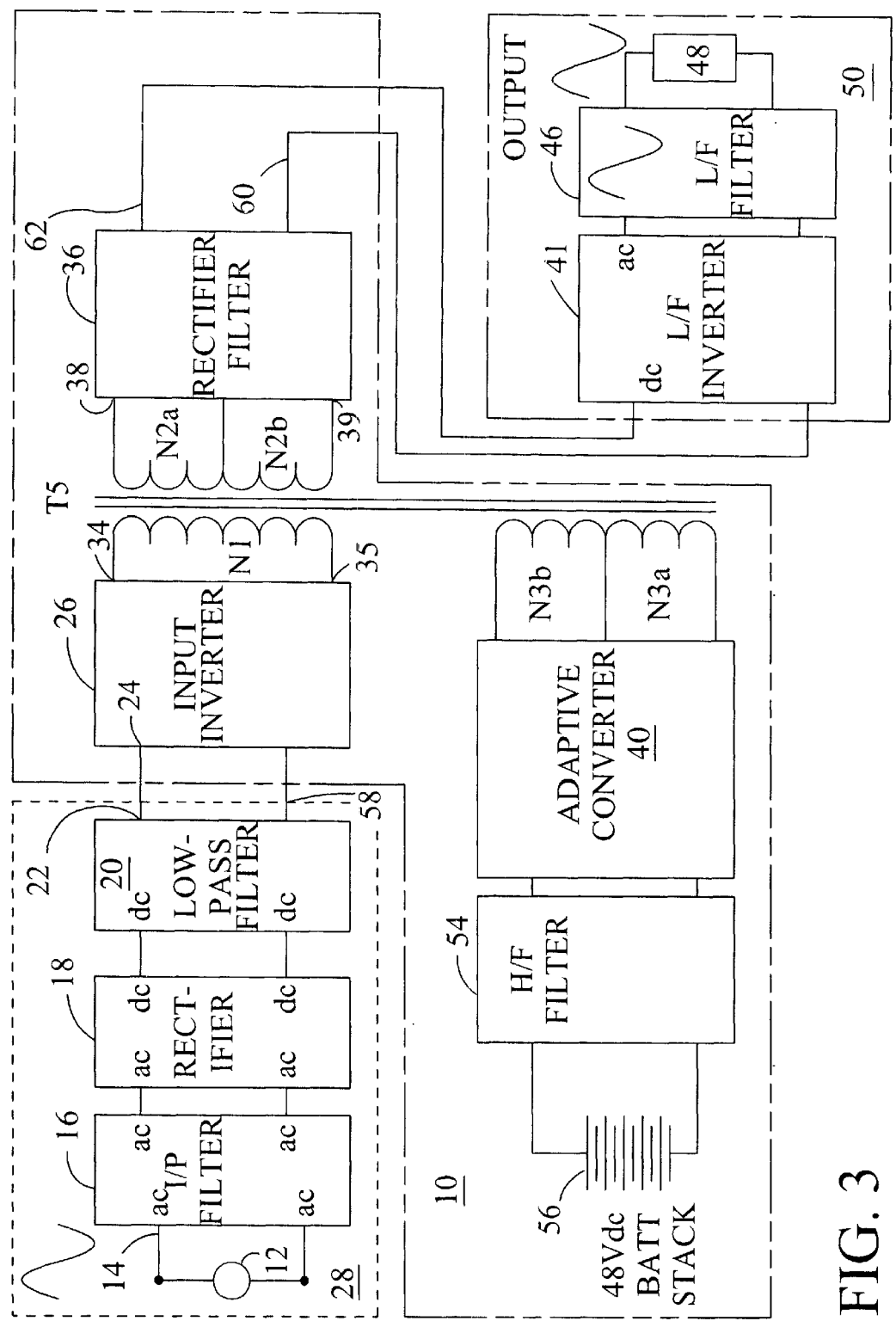
FIG. 3 is a block diagram of the invention UN-INTERRUPTIBLE POWER SUPPLY(UPS) using one high frequency transformer with three windings.

Referring to FIG. 3, the elements in phantom block 10 characterize the invention un-interruptible power supply. The system shown uses a single high frequency transformer T5 having three windings for total isolation. The high frequency transformer T5 has a primary winding (N1) driven by an input inverter 26 at inverter outputs 34, 35.

A center tapped output winding (N2a, N2b) is coupled to a RECTIFIER FILTER 36 at rectifier filter inputs 38, 39. A charger winding (N3a, N3b)is coupled to an ADAPTIVE CONVERTER represented by block 40. The output of the RECTIFIER FILTER 36 at output voltage node 62 is coupled to provide power to a low-frequency inverter, L/F/INVERTER 41 which converts the dc into low frequency ac voltage that is filtered by low frequency filter, L/F FILTER 46. The filtered output low frequency ac voltage provides output power to an output load represented by block 48. The combination of elements within phantom block 50 represent a load 52 to the invention un-interruptible power supply 10 in FIGS. 4, 5 and 6. The output of the ADAPTIVE CONVERTER 40 is filtered by H/F FILTER (high frequency filter) 54 and while operating in a battery charge mode, its filtered output charges the battery, 48 Vdc BATT STACK 56.

Figure 4:
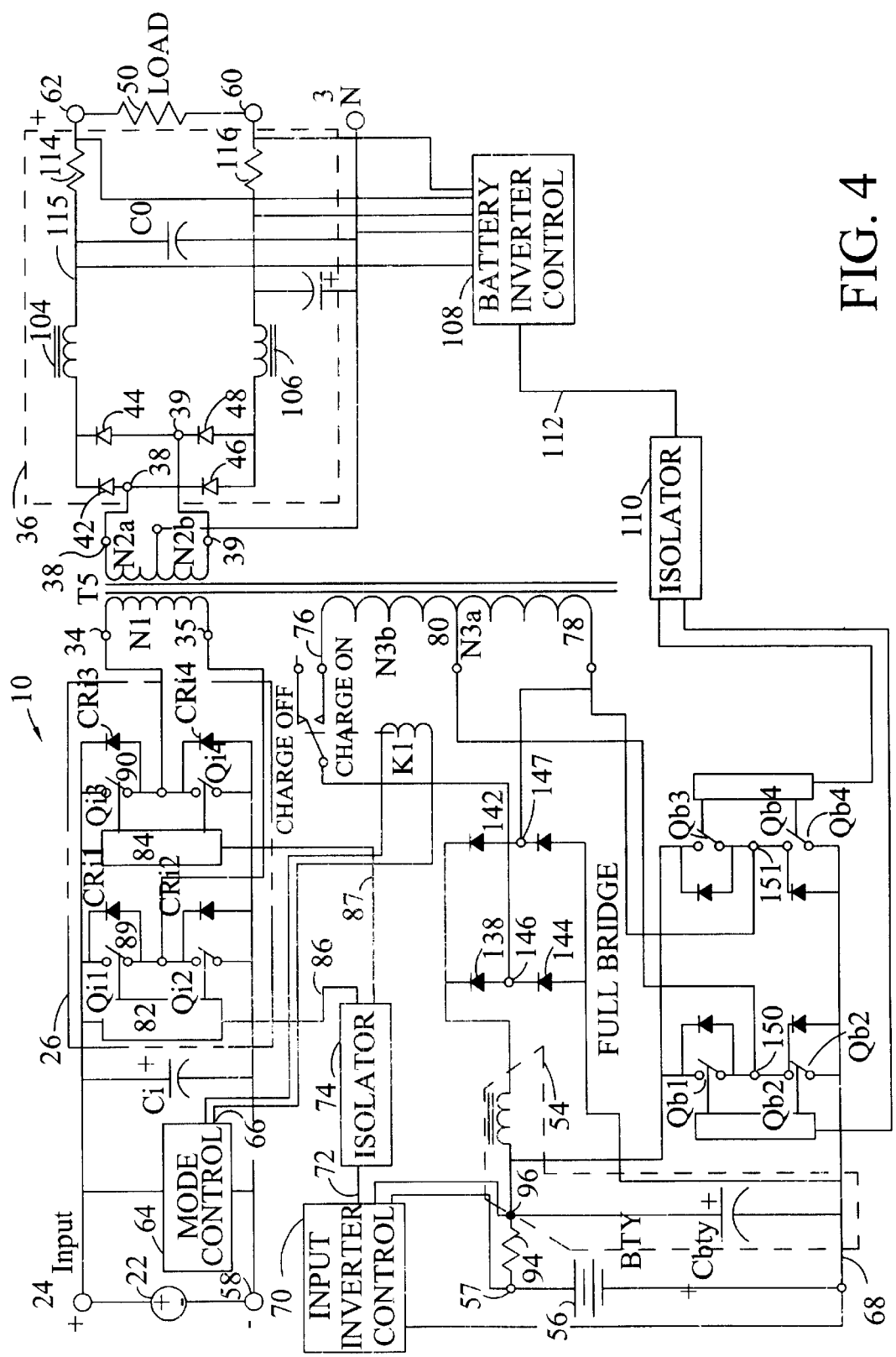
FIG. 4 is a schematic diagram of a first embodiment of the invention UPS using a bridge rectifier with four diodes in the charge mode to charge the battery and an H-bridge to drive the N3a winding to support operation on the battery.
Figure 5:
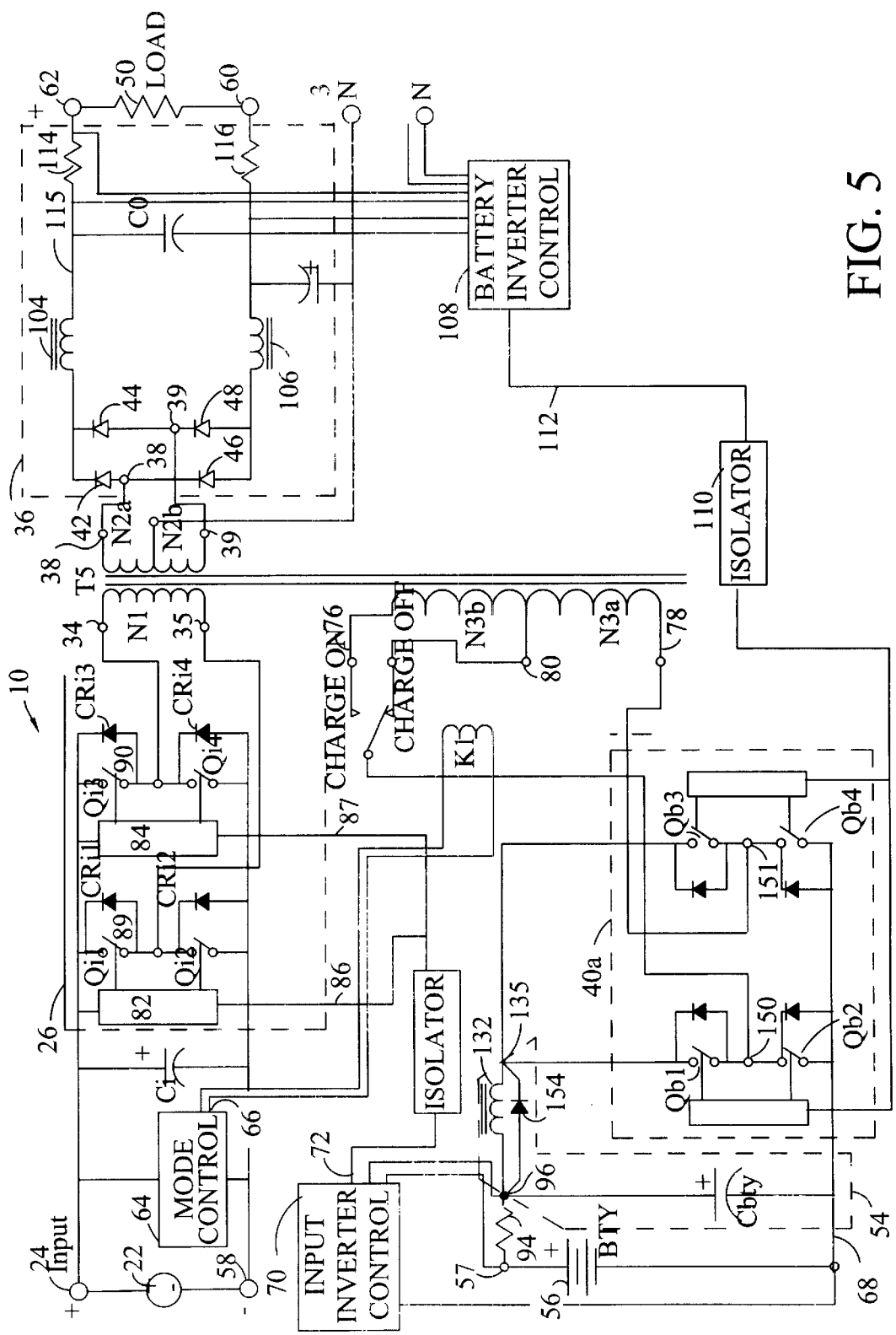
FIG. 5 is a schematic diagram of a second embodiment of the invention UPS eliminating the separate bridge of four rectifiers used in the topology of FIG. 4 and adding a single inductor shunt diode used with an H-bridge to drive the N3a winding to support operation on the battery.
Figure 6:
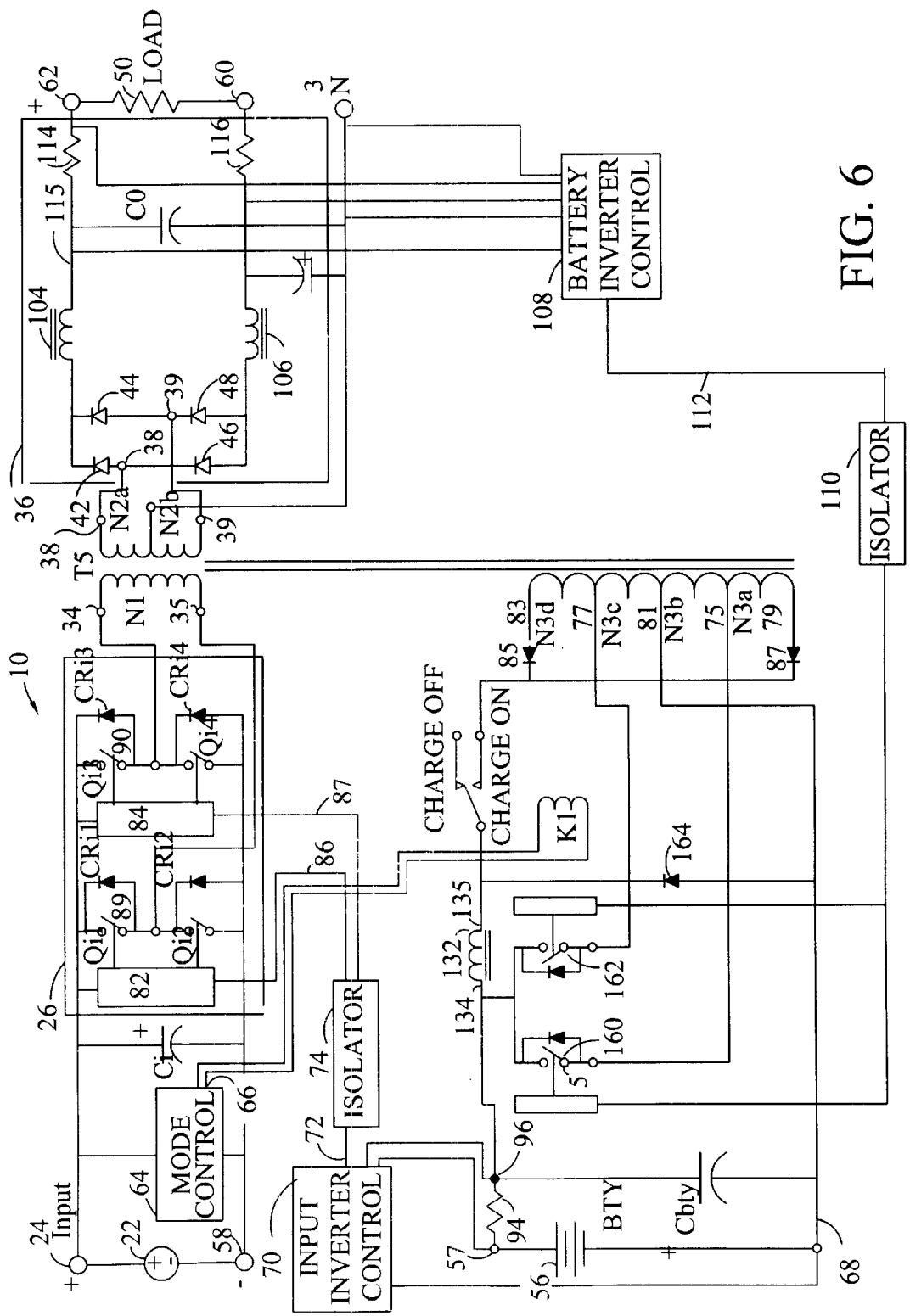
FIG. 6 is a schematic diagram of a third embodiment of the invention UPS using a full wave rectifier with two diodes in the charge mode and substituting a two switch push-pull drive and a free-wheeling diode for the separate bridge of four rectifiers used in the topology of FIG. 4 and the single inductor shunt diode used with an H-bridge in FIGS. 4 and 5 to support operation on the battery.

FIGS. 4, 5 and 6 show three alternative embodiments of the un-interruptible power supply 10. The function of the input source 12, the filter 16, the rectifier 18 and the low-pass filter are combined in phantom block 28 to form an equivalent dc voltage source represented by the single dc voltage source 22. The output of phantom block 28 is coupled from the low-pass filter 20 of FIG. 3 and appears on FIGS. 4–6 as a dc input voltage source 22 at a dc input voltage node 24 into the un-interruptible power supply 10 referenced to a first reference potential, or ground, at a first reference potential node 58.

The un-interruptible power supply 10 provides an isolated output dc voltage at an output voltage node 62 referenced to a second reference potential node 60. The load 50 is connected between the output voltage node 62 and the second reference potential 60.

Figure 12:
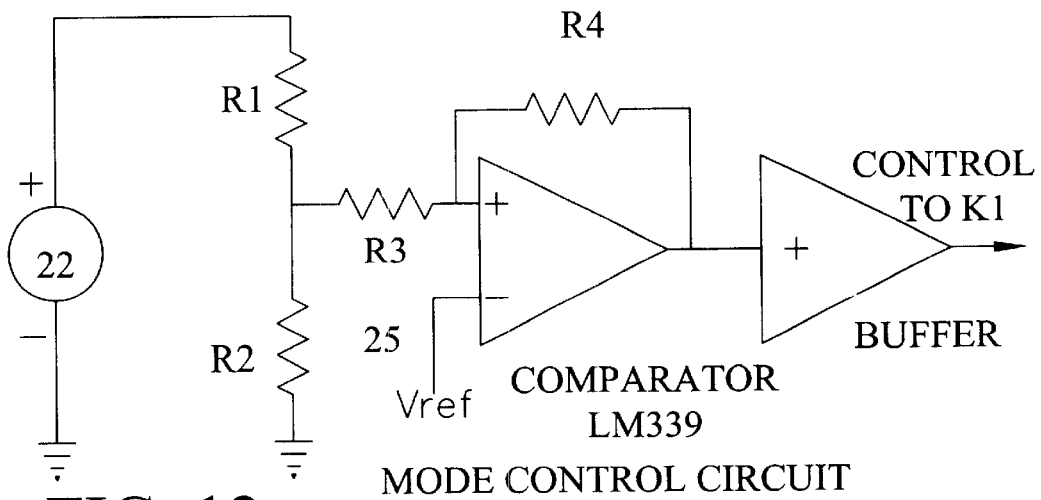
FIG. 12 is a simplified schematic of a threshold detection circuit with hysteresis for monitoring the amplitude of the input dc voltage.

A mode control circuit, represented by block 64, is coupled to monitor the dc input voltage 22 and provide a mode selection signal having a first or second state at its output 66. The mode selection signal assumes a first state in response to the dc input voltage 22 at input node 24 exceeding a first voltage level and a second state in response to the dc input voltage 22 passing below a second voltage level. FIG. 12 shows an embodiment of a typical mode selection circuit in which a comparator circuit such as an LM 339 senses the dc input voltage 22 via a resistor divider network formed by R1 and R2. The comparator has a feedback resistor R4 which in combination with R3 are selected to cause the comparator circuit to exhibit a predictable and predetermined hysteresis. The Vref input 25 to the comparator is derived from a precision reference voltage (not shown). The comparator circuit outputs the mode selection signal on signal line 66. The mode selection signal is shown applied to the pick coil of the charging relay, K1. As the input voltage drops below a predetermined threshold, the output of the comparator goes low and assumes a second state in response to the dc input voltage passing below the second voltage level. The relay K1 responds to the mode selection signal first state for providing a contact closure and to the second state to open the contacts.

The high frequency transformer T5 has at least a primary winding, such as N1, an output winding N2a, N2b and a charger winding such as N3a, N3b. The primary winding (N1) is connected to and driven by the output terminals 34, 35 of the input inverter within phantom block 26. The output winding (N2) is center tapped and is shown coupled to drive the input 38, 39 of the output bridge rectifier and filter within phantom block 36 depicted as a full bridge rectifier having diodes 42, 44, 46 and 48.

FIG. 4 shows the charger winding (N3) coupled to a first embodiment of an adaptive converter at terminals 76, 78 and 80. The input inverter 26 and the adaptive converter 40 use bi-directional semiconductor switches, such as power FET, having a conduction channel, and a control terminal such as gate. A body diode within the power FETs operate as clamp diodes to the rails and allow the reactive component of the load current to continue to flow in the winding of the high frequency transformer during short intervals when both switches in a branch are off. Capacitors coupled between the positive and negative terminals of the converters absorb the ripple current of the converter.

Battery 56 provides a battery voltage at a battery first terminal 57 measured with respect to a battery second terminal. The battery second terminal is connected to a third reference potential node 68.

Figure 13:
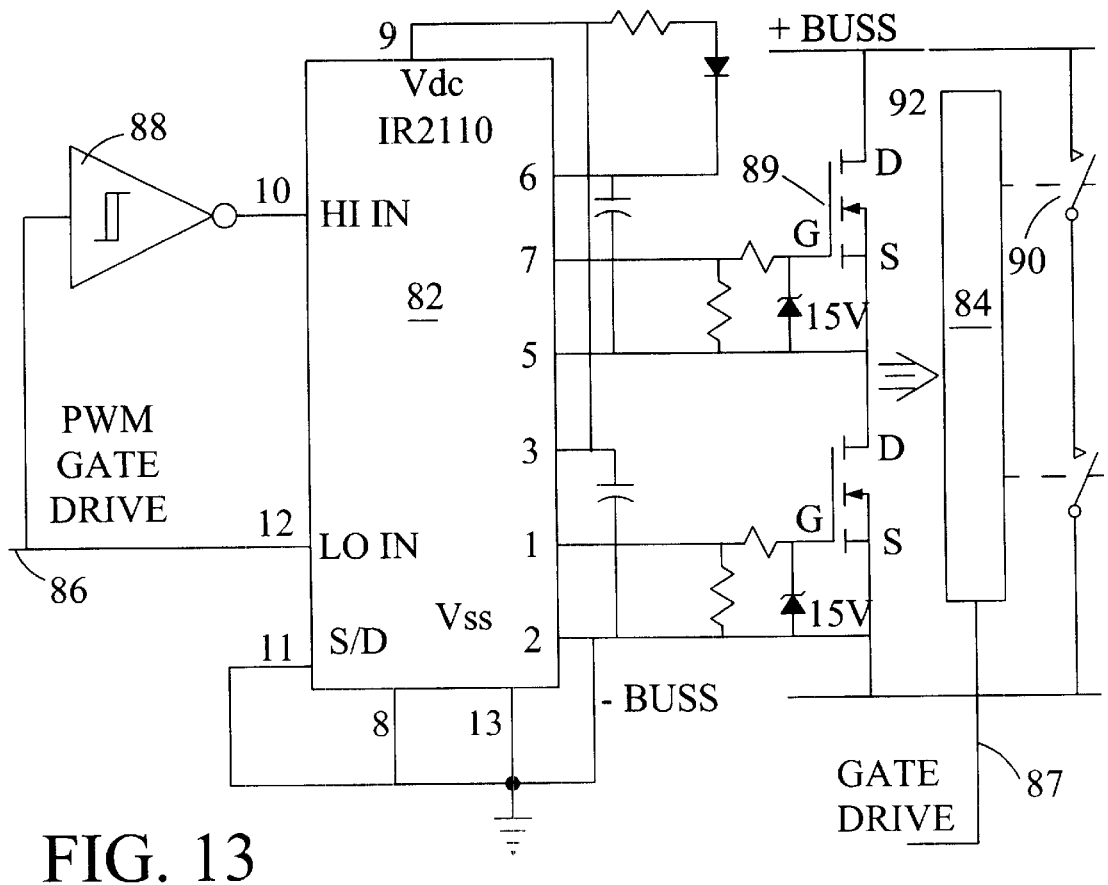
FIG. 13 is a simplified schematic of a typical driver for driving the totem-pole FETS in the left or right side of an H-Bridge circuit.

An input inverter control circuit 70 is shown referenced to the third reference potential node 68. The inverter is coupled to sense the battery voltage on the battery first terminal 57 and compare it to a predetermined battery reference voltage, typically an internal precision reference, and provide an input PWM (pulse width modulated) signal referenced to the third reference potential 68. The PWM signal is coupled via signal path 72 to an isolator 74, which typically provides at least one and more probably two optical couplers to provide isolated PWM outputs referenced to the first reference potential 58. The PWM outputs of the isolator are fed to the inputs of left and right branch driver circuits 82, 84 via isolated PWM signal paths 86, 87 which drive respective left and right totem-pole pairs of FETS or IGBTs 89, 90 shown as Qi1,–Qi4. The isolated PWM signal path 86 appears on FIG. 13 which depicts a typical drive circuit for the left branch of the input inverter 26. Inverter 88 provides a drive signal to pin 10 of driver 84 and insures that the both FETs are never on at the same time. Signal line 87 provides an isolated PWM signal for the right branch driver circuit 84 of the input inverter 26, shown in a simplified form on FIG. 13.

Figure 10:
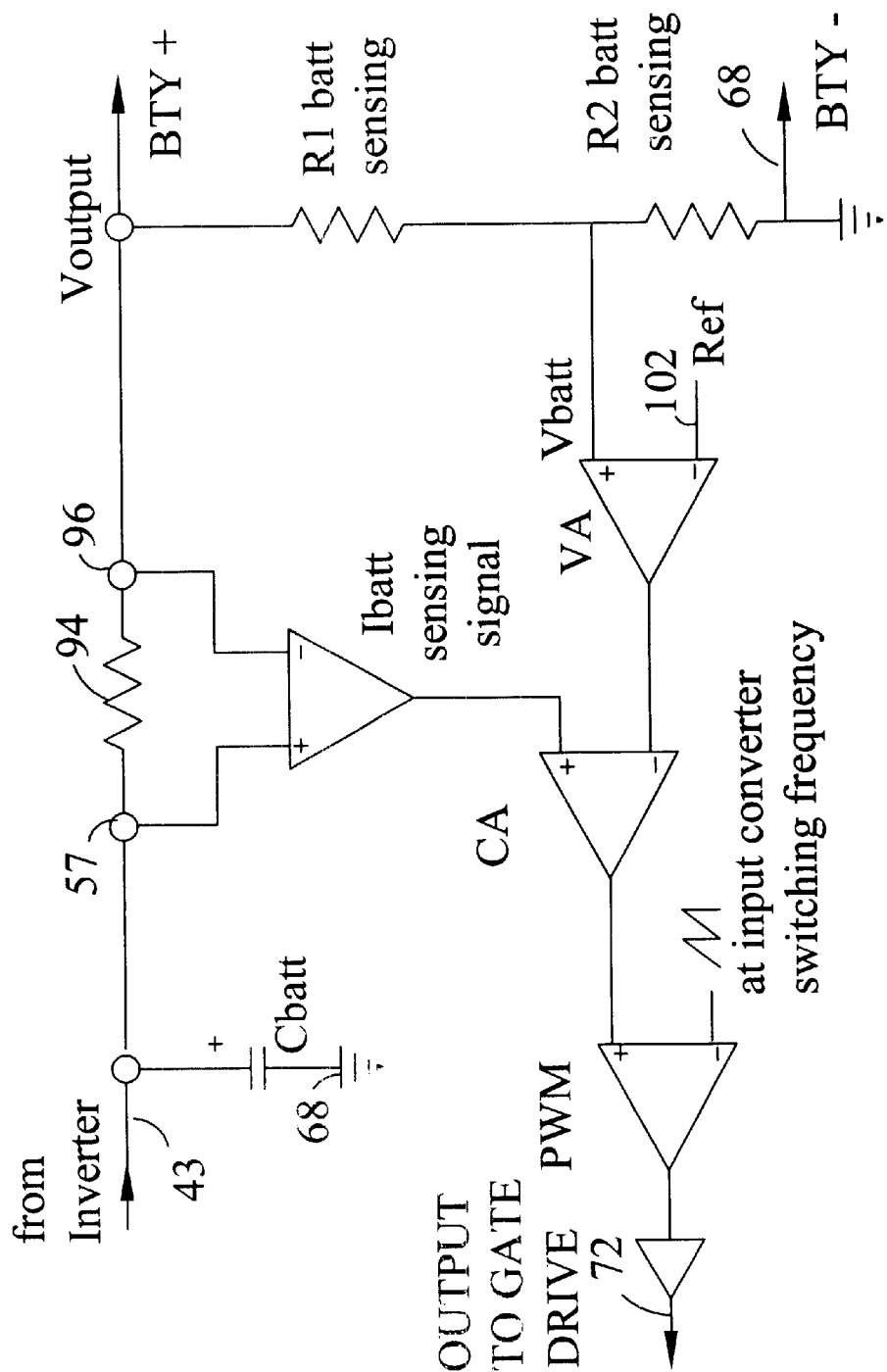
FIG. 10 is a simplified embodiment of the INPUT INVERTER CONTROL function for sensing the battery current and battery voltage and adjusting the battery voltage and battery current to a predetermined level by controlling the duty cycle of the input converter.

Referring to FIG. 10, operation of the input inverter control circuit 70 provides the PWM signal to the isolator 74, via signal line 72. A current sense resistor 94 is connected between the battery first terminal 57 and the battery sense voltage terminal 96.

The PWM signal on signal line 72 has a duty cycle characterized to increase for a sensed battery voltage at battery sense voltage terminal 96 that has a value less than a predetermined battery voltage measured with respect to the third reference potential. The resistor divider of resistors 98 and 100 provide a portion of the sensed battery voltage at battery sense voltage terminal 96. The ref voltage at 102 represents a precision internal reference voltage that provides a voltage related to a predetermined battery voltage. The PWM signal decreases for a sensed battery voltage having a value more than the predetermined battery voltage measured with respect to the third reference potential 68.

Referring again to FIGS. 4, 5 and 6, input inverter 26 is shown as an H-Bridge topology referenced to the first reference potential node 58 and coupled to transfer power from the dc input voltage source 22 to the primary winding of T5. The H-Bridge has left and right branches 89, 90. Each respective branch has a pair of series connected bi-directional semiconductor switching devices such as FETs or IGBTs. Each semiconductor switching device has a bi-directional conduction channel and a control gate. Each pair of series connected bi-directional conduction channels are connected at a respective H-bridge output node common to nodes 34 and 35. Each H-Bridge output node is connected to a respective primary winding first and second terminal 34, 35. Each bi-directional semiconductor switching device control gate is coupled to and driven by a high and low side bootstrap peripheral driver such as the IR2110 peripheral drivers from International Rectifier. Each bootstrap peripheral driver is driven by an isolated input PWM signals from the isolator 74.

Figure 7:
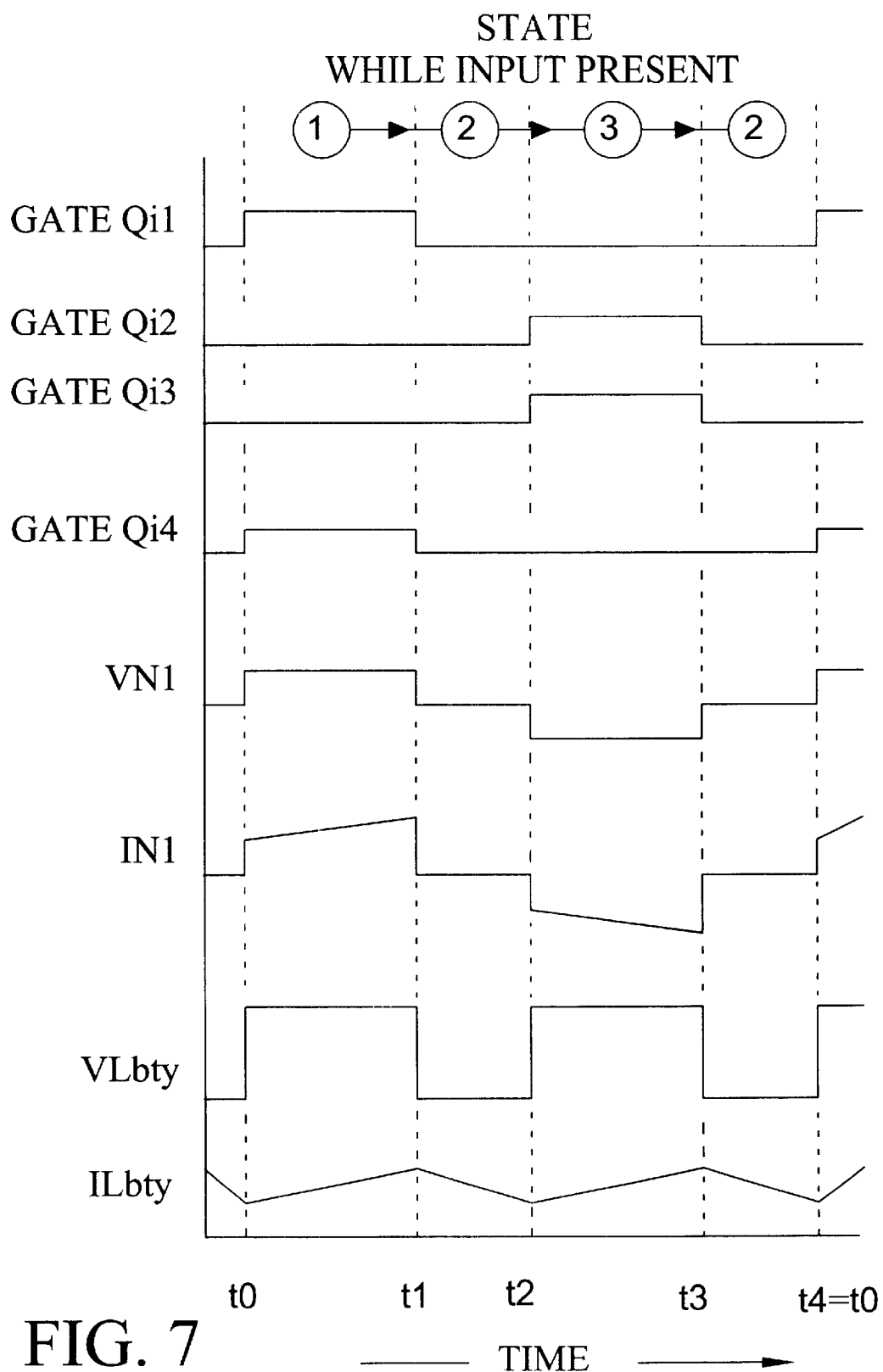
FIG. 7 is a timing diagram for the high frequency input power converter operating with a load and with adequate input voltage present.

FIG. 7 shows circuit voltage and current waveforms common to the input inverter 26 for operation while the input power is present and has a voltage value high enough to cause the mode control circuit to output a first state signal. The first state signal commands a mode in which the input power is transferred to the output, and the adaptive converter in the circuits of FIGS. 4, 5 and 6 charges the battery 56.

Referring again to FIG. 7 and to the circuits of FIGS. 4 and 5, during the interval t0 to t1 or circle state 1, it can be seen that a positive isolated PWM signal or gate drive signal is applied to the gates of FET Qi1 and Qi4 driving the two FETs into hard conduction and applying the dc input voltage 22 to the T5 primary winding between terminals 35 and 34. The voltage across the primary winding of T5 is VN1. The current in the primary is represented by the IN1 waveform. The step portion of the waveform relates to the reflected load current and the ramp portion is the result of primary magnetizing current and magnetizing current in the dual inductors 104, 106.

Figure 8:
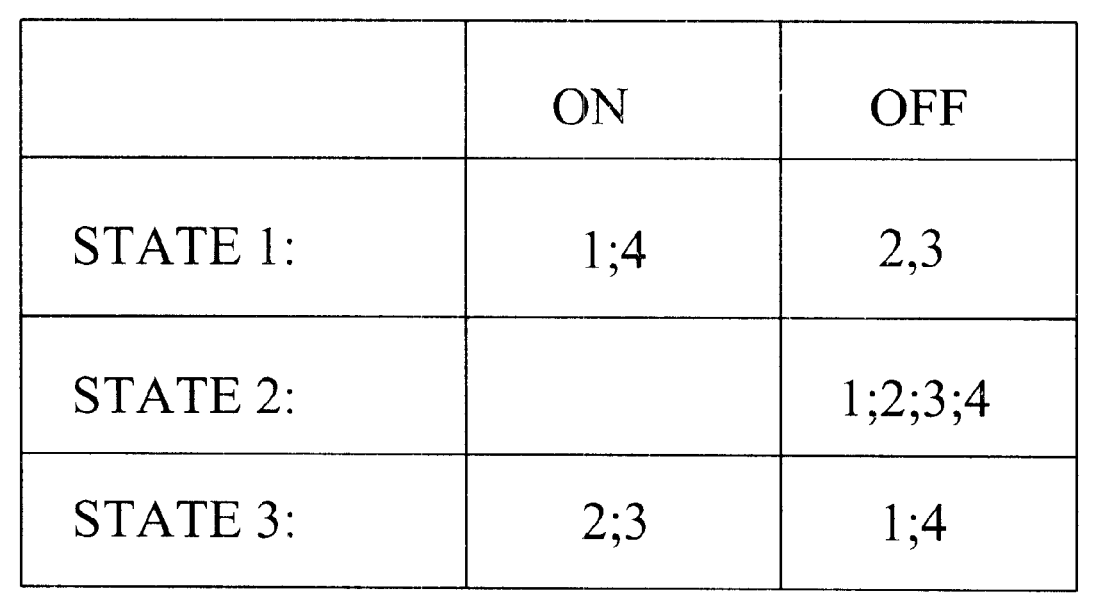

The waveform VLbty is the voltage across the inductors 104, 106. The waveform ILbty is the current waveform in the inductors resulting from the voltage waveform VLbty across the inductors. The time interval from t1 to t2, representing circle state 2 is dead time during which all of the FETs are in a non-conducting state. The subsequent state circle 3 followed by circle 2 provides for reversing the polarity of the voltage applied to the primary of T5 and the respective load current in the primary. FIG. 8 provides a state table for the input inverter FET switches during the circle states of FIGS. 7 and 9.

Figure 9:
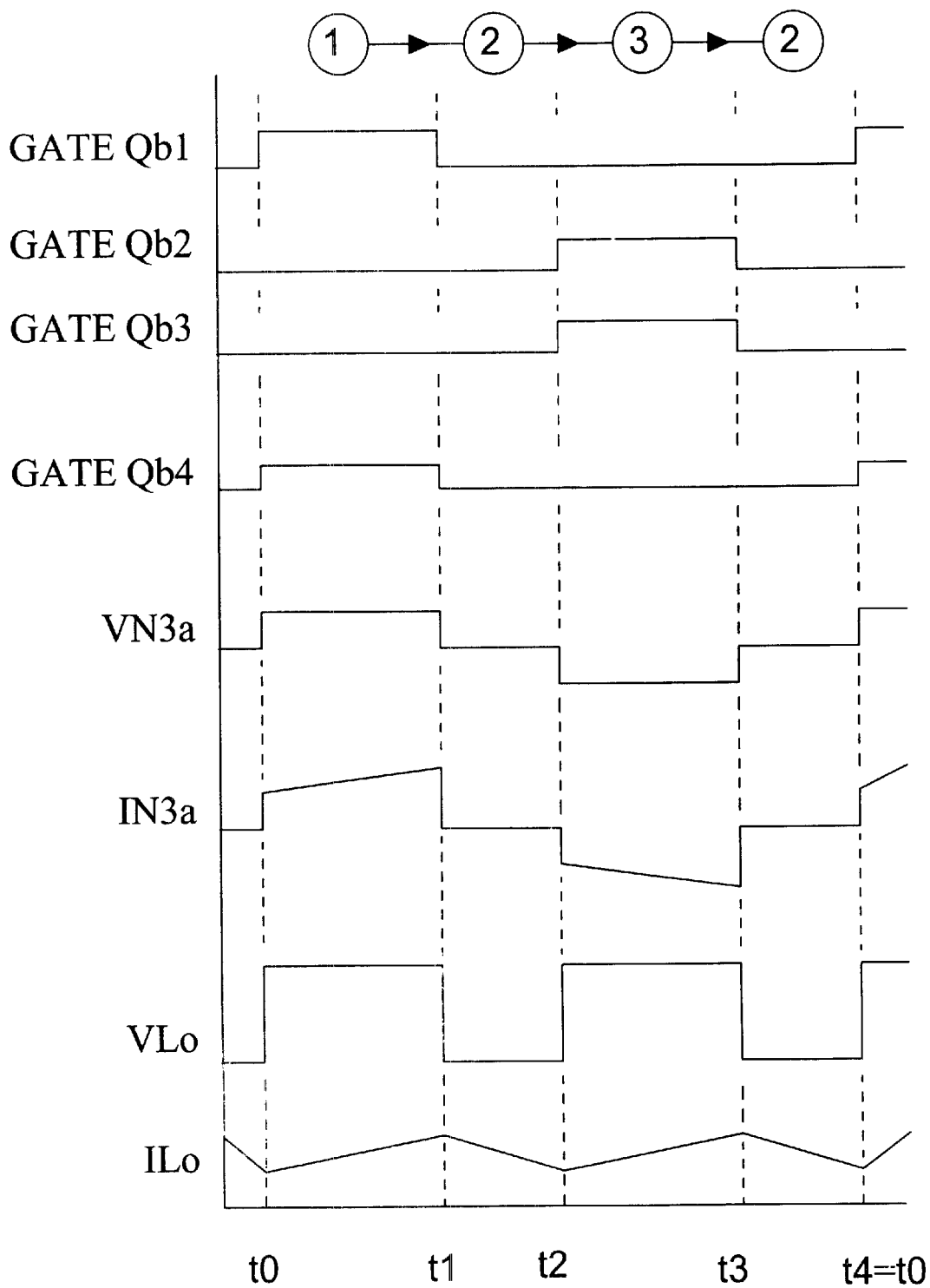
FIG. 9 is a timing diagram for the high frequency battery power converter of FIGS. 4 and 5 while supporting an output load and operating on the battery.

FIG. 9 shows circuit voltage and current waveforms common to the adaptive inverter 40 for operation while the input power is present and has an input voltage value low enough to cause the mode control circuit to output a second state signal to command that the input power is no longer available and battery power will be transferred to the output from the embodiments of the adaptive converters found in the circuits of FIGS. 4 and 5. The waveforms for Qb1 and Qb4 represent gate drive signals to the gates of FETs Qb1 and Qb4. The waveform VN3$a$ is the voltage applied across the N3$a$ winding of the adaptive converter 40 by the H-Bridge switches as a result of the gate drive voltages. The IN3$a$ waveform represents a composite of reflected load current and the magnetizing current from the voltage across the inductors 104, 106. The VLo waveform represents the step voltage across the inductors 104, 106. The time interval from t1 to t2, represents the circle 2 state and it is dead time during which all of the FETs are in a non-conducting state. The subsequent state circle 3 followed by circle 2 provides for reversing the H-Bridge drive and applying drive to the N3$b$ winding. The ILo waveform represents the current in the inductors 104 and 106. FIG. 8 provides a state table for the adaptive inverter 40 FET switches Qb1–Qb4 during the circle states at the top of FIG. 7 and FIG. 9.

Figure 11:
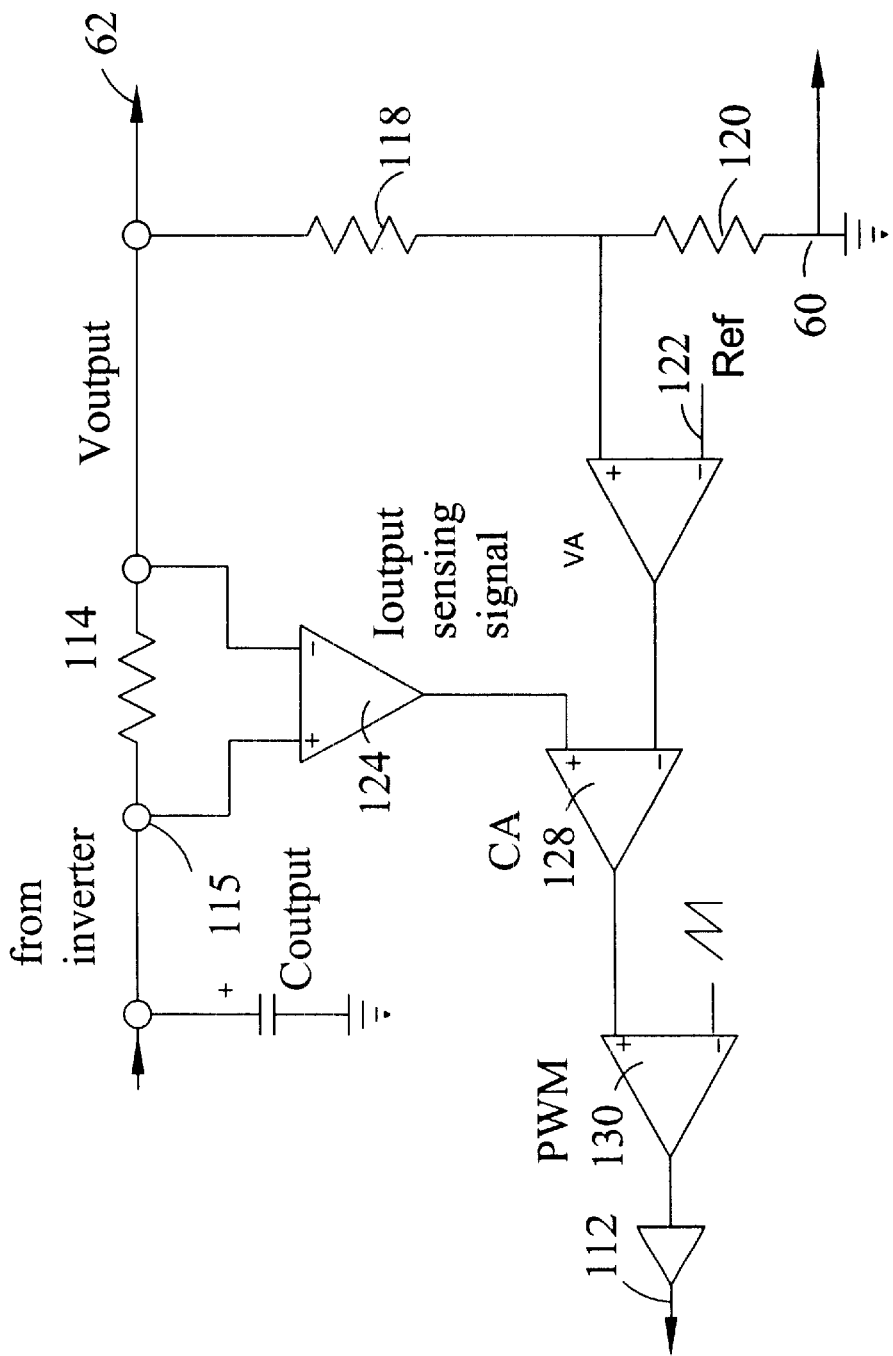
FIG. 11 is a simplified embodiment of the BATTERY INVERTER CONTROL function for sensing the output current and output voltage and adjusting the duty cycle of the battery driven inverter to support the output voltage to the load.

FIG. 11 shows the battery inverter control circuit 108 represented by blocks 108 on FIGS. 4, 5 and 6. The battery inverter control circuit 108 is referenced to the second reference potential 60 or to neutral and is coupled to sense the isolated output dc voltage at output voltage node 62. The battery inverter control circuit 108 provides the a PWM signal to the isolator 110 via signal line 112. The topology of the input inverter circuit 70 of FIG. 10 is similar to the battery inverter control schematic of FIG. 11

Referring to FIG. 11, a current sense resistor 114 is is connected between the output current sense terminal 115 and the output voltage node 62. In an alternative high noise embodiment, a second current sense resistor 116 is used in the current return path from the second reference potential 60 to reduce common mode noise effects. The second sense resistor option is not shown on FIG. 11.

The PWM signal on signal line 112 has a duty cycle characterized to increase for a sensed output voltage at output voltage node 62 that has a value less than a predetermined output voltage measured with respect to the second reference potential. The PWM signal on signal line 112 has a duty cycle characterized to decreases for a sensed output voltage having a value more than the predetermined output voltage measured with respect to the second reference potential 60. The resistor divider of resistors 118 and 120 provide a portion of the sensed output voltage at output voltage node 62. The ref voltage at 122 represents a precision internal reference voltage that is related to a predetermined output voltage.

As current to the load passes through the sense resistor 114, a first amplifier 124 senses the voltage across the current sense resistor and convert the current amplitude into a current scaled output voltage. A second amplifier 126 has a first input coupled to sense a portion of the output voltage and a second input coupled to sense the predetermined voltage reference 122. The second amplifier outputs an amplified difference voltage representing the amplified difference between between the portion of the output voltage sensed by resistor divider 118, 120 and the predetermined reference voltage 122. A third amplifier 128 has a first input coupled to receive the current scaled output voltage of the first amplifier and a second input coupled to receive the amplified difference voltage between the portion of the output voltage and the predetermined reference voltage 122. The third amplifier outputs a control level voltage to the non-inverting input of a comparator 130. The inverting input is coupled to receive a periodic sawtooth voltage wave form. Each sawtooth voltage waveform has a duration equal to one half of a total switching cycle. A second input coupled to receive the control level voltage from the third amplifier 128. The output of the comparator 130 is coupled to start a power cycle at the beginning of each sawtooth voltage waveform. The comparator 130 is coupled to reverse the state of its output in response to the sawtooth voltage exceeding the control level voltage from the third amplifier 128 thereby terminating the power cycle in progress.

FIGS. 4, 5 and 6 provide three alternative embodiments of the adaptive converter 40, each of which is referenced to the third reference potential node 68 and each of which is coupled to the transformer charger winding for charging the battery 56 in response to the first mode selection signal being a first state, such as a high. Each of the alternative embodiments is coupled to the transformer charger winding N3 for discharging the battery 56 in response to the first mode selection signal being a second state, such as a low. Each embodiment is coupled to receive and be responsive to the battery PWM drive signal to transfer power from the battery to the transformer charger winding to provide and support the isolated output dc voltage source at output voltage node 62 in response to a mode selection signal second state.

The Adaptive Converter of FIG. 4:

Referring to FIG. 4, the adaptive converter 40 has an inductor 132 that has a first and second terminal, 134, 135. Recall that a current sense resistor 94 is connected between the battery first terminal 57 and the battery sense voltage terminal 96. The inductor's first terminal 134 is connected to the battery sense voltage terminal 96. The high frequency transformer charger winding has a first segment N3a that has a first number of turns between terminals 78 and 80 for coupling power from the battery first terminal 57 to the output winding. The charger winding has a second segment that has additional turns and terminates at a third terminal 76.

The total winding from the first terminal 78 to the third terminal 76 is sized for use in delivering power from the input inverter 26 via the primary winding N1 34, 35 via the charger winding 76, 78, via the closed contact of relay K1 and via the inductor 132 to charge the battery 56. In addition, the adaptive converter 40 has a bridge rectifier circuit with four rectifiers 138–144 that has a left branch with diodes 138, 144 and a right branch with diodes 142, 140. Each branch has a first and second rectifier. Each branch of the rectifier circuit has an output end coupled to the inductor second terminal 135 and a return end coupled to the third reference potential 68. The first and second rectifier of each branch are connected at a respective left and right branch common node 146, 147.

The charger winding first and third terminals 78, 76 are coupled to drive the respective bridge rectifier right and left branch common nodes 146, 147 via the mode control circuit contact closure of relay K1 in response to a mode selection signal first state.

The adaptive converter 40 of FIG. 4 also has an H-bridge switching circuit that has a left and right branch coupled between the battery first terminal 57 and the third reference potential 68. Each respective branch has a pair of series connected bi-directional semiconductor switching devices, such as FETS or IGBTs. Each semiconductor switching device has a bi-directional conduction channel and a control gate. Each pair of series connected bi-directional conduction channels are connected at a respective H-bridge output node 150, 151. Each H-Bridge output node is connected to the charger winding first and second terminal 78, 80 respectively. Each bi-directional semiconductor switching device control gate is coupled to and driven by a respective high and low side bootstrap peripheral driver, such as an IR2110. Each bootstrap peripheral driver is driven by a respective complementary battery PWM signal pair in response to the mode control signal being in a second state. The battery PWM signals may be isolated such as with optical isolators if the second and third reference potentials are not common.

The Adaptive Converter of FIG. 5:

FIG. 5 shows that the adaptive converter 40a has an inductor 132 that has a first and second terminal, 134, 135. A current sense resistor 94 is connected between the battery first terminal 57 and the battery sense voltage terminal 96. The inductor's first terminal 134 is connected to the battery sense voltage terminal 96. The high frequency transformer charger winding has a first segment N3a that has a first number of turns between terminals 78 and 80 for coupling power from the battery first terminal 57 to the output winding. The charger winding has a second segment that has additional turns and terminates at a third terminal 76. The total winding from the first terminal 78 to the third terminal 76 is sized for use in delivering power from the input inverter 26 via the primary winding N1 34, 35 via the charger winding 76, 78, via the closed contact of relay K1 and via the inductor 132 to charge the battery 56.

The adaptive converter 40a also has a shunt diode 154. The shunt diode is connected from the battery sense terminal 96 to the inductor second terminal 135. The battery sense terminal is connected to the battery first terminal 57 with a fractional ohm current sense resistor, so the inductor first terminal 134 is effectively connected to the battery first terminal 57. The shunt diode is connected so as to be forward biased in response to current leaving the battery when the mode control signal is in the second state.

The adaptive converter 40a of FIG. 5 also has an H-bridge switching circuit that has a left and right branch coupled between the inductor second terminal 135 and the third reference potential 68. Each respective branch has a pair of series connected bi-directional semiconductor switching devices, such as FETS or IGBTs. Each semiconductor switching device has a bi-directional conduction channel, a control gate and a freewheeling body diode. In the event that each respective semiconductor switching device lacks a freewheeling diode, then each semiconductor switching device is to be shunted with an external freewheeling diode to permit the passage of battery charger current through the transferred normally open contact of the K1 relay in response to a mode control signal being in a first state.

The freewheeling diodes are mapped onto the H-bridge semiconductor switching devices to form a contiguous full bridge rectifier in parallel with the H-Bridge. Each pair of series connected bi-directional conduction channels are connected at a respective H-bridge output node 150, 151. The right branch output node is connected to the charger winding first terminal 78. The left branch output node is connected to the charger winding first terminal 80 via a mode control second state closure.

Each bi-directional semiconductor switching device control gate is coupled to and driven by a respective high and low side bootstrap peripheral driver, such as an IR2110. Each bootstrap peripheral driver is driven by a respective complementary battery PWM signal pair in response to the mode control signal being in a second state. The battery PWM signals may be isolated such as with optical isolators if the second and third reference potentials are not common. The Adaptive Converter of FIG. 6:

FIG. 6 shows that the adaptive converter 40*a* has an inductor 132 that has a first and second terminal, 134, 135. A current sense resistor 94 is connected between the battery first terminal 57 and the battery sense voltage terminal 96. The inductor's first terminal 134 is connected to the battery sense voltage terminal 96.

The high frequency transformer charger winding has a center-tapped segment N3*b*, N3*c* that has two end terminals 75, 77 and a center tapped terminal 81 that is used to couple power from the battery first terminal 57, or the battery sense terminal 96 to the output winding N2*a*, N2*b*. The center tapped terminal is connected to the third reference potential 68. The charger winding has a second and third segment N3*a* and N3*d* respectively. The second and third segments have substantially equivalent turns counts. The second and third segments each have a first and second terminal. The first terminal of the second segment N3*a* is connected to end terminal 75. The first terminal of the third segment N3*d* is connected to end terminal 77. The second terminal of the second segment 79 and the second terminal of the third segment 83 is connected to the anode of a respective first and second battery charge diode 85, 87.

As shown in FIG. 6, inductor 135 has a first terminal 134 coupled to battery terminal 56 and a second terminal 135 connected to the transfer terminal of the K1 Relay. The battery charge diodes 85, 87 have their cathodes connected in common.. As K1 transfers in response to a mode control signal assuming a first state, the common cathode connection of the battery charge diodes 85, 87 is connected to the inductor second terminal. The common cathodes are thereby connected through the closure to the inductor second terminal 135. The battery charge diodes form a full wave rectifier.

The series combination of the center taped segment and the second and third segments is sized to drive the full wave rectifier formed by the two battery charge diodes 85, 87 to deliver power from the input inverter 26 via the primary winding 34, 35, via the charger winding, N3*a*, N3*b*, N3*c* and N3*d*, via the contact closure of K1, via the inductor 132 and via sense resistor 94 to charge the battery 56.

The adaptive converter 40*a* also has a full wave synchronous bi-directional rectifier circuit with a left and right branch. Each branch has a semiconductor switching device, 160, 162 such as a FET or an IGBT having a conduction channel and a control gate. Each conduction channel has a first and second terminal. The left and right branch conduction channel first terminals are connected to the inductor first end 134. The left and right branch conduction channel second terminals are connected to respective charger winding center tapped segment ends 75, 77 respectively.

A freewheeling rectifier 164 has an output end, a cathode, coupled to the inductor second terminal 135. A return end, the anode, is coupled to the third reference potential 68.

In alternative applications, the high frequency transformer may have its primary winding, output winding and charger winding isolated from each other. In alternate embodiments, combinations of the circuits using the windings may have common grounds. Connecting grounds or reference potentials to each other is discretionary or driven by the requirements of the application.

Figure 14:
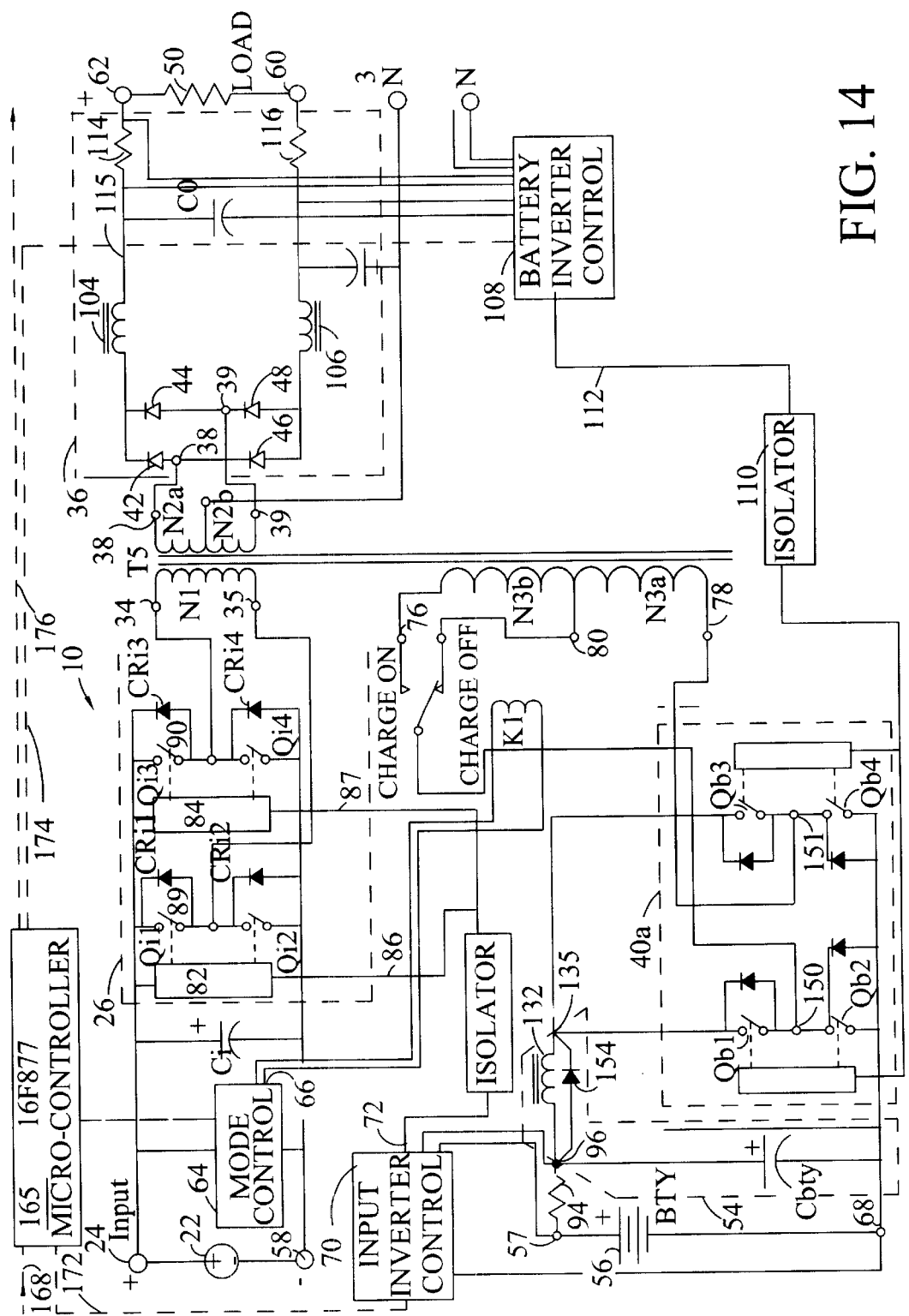
FIG. 14 is the schematic of the circuit of FIG. 5 including the use of a micro-controller for the control or performance of at least one of the functions selected from the group of functions including, mode control, input inverter control, battery inverter control and external interface control.

FIG. 14 is an alternative embodiment based on the embodiment of FIG. 5 showing the use of a micro-controller 165 such as 16F877 from Microchip of Phoenix, Ariz. In the application shown, phantom line 168 from the left represents a signal path from external sources of control to the component such as signals to provide necessary data and control such as a turn-on or turn-off commands. Phantom lines 170, 172 and 174 represent signal paths for supplying data and or discrete signals for the bi-direction or single directional control of the respective functions, such as the MODE CONTROL 64, the INPUT INVERTER CONTROL 70, and the BATTERY INVERTER CONTROL 108 respectively.

The use of micro-controllers for the performance of or the control of complex functions in power supplies has been growing in popularity as the cost of such components has decreased. Such components have internal analog to digital converters for monitoring analog signals, such as the scaled value of the dc input voltage 22, through the mode control function block 64 or the battery voltage through the input inverter control block 70. The function of the battery inverter control block 108 might also be performed by a micro-controller. Signal line 176 represents a signal path for supplying data and or discrete signals to communicate with other external devices such as computers or other power supplies.

While particular embodiments of the present invention have been disclosed, it is to be understood that various different modifications are possible and are contemplated with in the true spirit and scope of the appended claims. There is no intention, therefore to limit the claims based on the disclosure herein presented.

I claim:

1. An un-interruptible power supply coupled to receive a dc input voltage at a dc input voltage node referenced to a first reference potential node, and to provide an isolated output dc voltage referenced to a second reference potential node to a load comprising:

a mode control circuit coupled to monitor the dc input voltage and to provide a mode selection signal having a first state in response to the dc input voltage exceeding a first voltage level and a second state in response to the dc input voltage passing below a second voltage level, a high frequency transformer having at least a primary winding, an output winding and a charger winding, a battery having a battery voltage at a battery first terminal measured with respect to a battery second terminal, the battery second terminal being coupled to a third reference potential node, an input inverter referenced to the first reference potential node and coupled to transfer power from the dc input voltage, to provide pulse width modulated power to the primary winding of the high frequency transformer, an output rectifier and filter driven by the transformer output winding to provide the output dc voltage referenced to the second reference potential node, an adaptive converter referenced to the third reference potential node and coupled to the transformer charger winding for charging the battery in response to the mode selection signal first state to transfer power from the battery to the transformer charger winding to provide the output dc voltage source in response to the mode selection signal second state.

2. The un-interruptible power supply of claim 1 further comprising:

a micro-controller coupled via signal paths to communicate data and control signals for the control and or performance of at least one of the functions selected from the group of functions including, mode control, and or an external interface control.

3. An un-interruptible power supply coupled to receive a dc input voltage at a dc input voltage node referenced to a first reference potential node, and to provide an isolated output dc voltage referenced to a second reference potential node to a load comprising:

a mode control circuit coupled to monitor the dc input voltage and to provide a mode selection signal having a first state in response to the dc input voltage exceeding a first voltage level and a second state in response to the dc input voltage passing below a second voltage level, a high frequency transformer having at least a primary winding, an output winding and a charger winding, a battery having a battery voltage at a battery first terminal measured with respect to a battery second terminal, the battery second terminal being coupled to a third reference potential node, an input inverter control circuit referenced to the third reference potential node and coupled to sense the battery voltage on the battery first terminal and a predetermined battery reference voltage and to provide an input PWM (pulse width modulated) signal referenced to third reference potential and having a duty cycle characterized to increase for a sensed battery voltage having a value less than a predetermined battery voltage measured with respect to the third reference potential, and decrease for a sensed battery voltage having a value more than the predetermined battery potential, an input inverter referenced to the first reference potential node and coupled to transfer power from the dc input voltage, the input inverter being responsive to the input PWM signal to provide pulse width modulated power to the primary winding of the high frequency transformer, an output rectifier and filter driven by the transformer output winding to provide the output dc voltage referenced to the second reference potential node, an adaptive converter referenced to the third reference potential node and coupled to the transformer charger winding for charging the battery in response to the mode selection signal first state to transfer power from the battery to the transformer charger winding to provide the output dc voltage source in response to the mode selection signal second state.

4. The un-interruptible power supply of claim 3 further comprising:

a micro-controller coupled via signal paths to communicate data and control signals for the control or performance of at least one of the functions selected from the group of functions including, mode control, input inverter control.

5. An un-interruptible power supply coupled to receive a dc input voltage at a dc input voltage node referenced to a first reference potential node, and to provide an isolated output dc voltage referenced to a second reference potential node to a load comprising:

a mode control circuit coupled to monitor the dc input voltage and to provide a mode selection signal having a first state in response to the dc input voltage exceeding a first voltage level and a second state in response to the dc input voltage passing below a second voltage level, a high frequency transformer having at least a primary winding, an output winding and a charger winding, a battery having a battery voltage at a battery first terminal measured with respect to a battery second terminal, the battery second terminal being coupled to a third reference potential node, an input inverter referenced to the first reference potential node and coupled to transfer power from the dc input voltage, to provide pulse width modulated power to the primary winding of the high frequency transformer, an output rectifier and filter driven by the transformer output winding to provide the output dc voltage referenced to the second reference potential node, a battery inverter control circuit referenced to the second reference potential and coupled to sense the isolated output dc voltage and a predetermined output reference voltage to provide a battery PWM (pulse width modulated) signal having a duty cycle characterized to increase for a sensed isolated output dc voltage having a value less than a predetermined output reference voltage, and decrease for a sensed isolated output dc voltage having a value more than the predetermined output reference voltage, an adaptive converter referenced to the third reference potential node and coupled to the transformer charger winding for charging the battery in response to the mode selection signal first state and being coupled to transfer power from the battery to the transformer charger winding to provide the output dc voltage source in response to the mode selection signal second state.

6. The un-interruptible power supply of claim 5 further comprising:

a micro-controller coupled via signal paths to communicate data and control signals for the control or performance of at least one of the functions selected from the group of functions including, mode control, battery inverter control.

7. An un-interruptible power supply coupled to receive a dc input voltage at a dc input voltage node referenced to a first reference potential at a first reference potential node, and to provide an isolated output dc voltage referenced to a second reference potential node to a load comprising:

a mode control circuit coupled to monitor the dc input voltage and to provide a mode selection signal having a first state in response to the dc input voltage exceeding a first voltage level and a second state in response to the dc input voltage passing below a second voltage level, a high frequency transformer having at least a primary winding, an output winding and a charger winding, a battery having a battery voltage at a battery first terminal measured with respect to a battery second terminal, the battery second terminal being coupled to a third reference potential node, an input inverter control circuit referenced to the third reference potential node and coupled to sense the battery voltage on the battery first terminal and a predetermined battery reference voltage and to provide an input PWM (pulse width modulated) signal referenced to the third reference potential and having a duty cycle characterized to increase for a sensed battery voltage having a value less than a predetermined battery voltage measured with respect to the third reference potential, and decrease for a sensed battery voltage having a value more than the predetermined battery voltage measured with respect to the third reference potential, an input inverter referenced to the first reference potential node and coupled to transfer power from the dc input voltage, the input inverter being responsive to the input PWM signal to provide pulse width modulated power to the primary winding of the high frequency transformer, an output rectifier and filter driven by the transformer output winding to provide the isolated output dc voltage referenced to the second reference potential node, a battery inverter control circuit referenced to the second reference potential and coupled to sense the isolated output dc voltage and a predetermined output reference voltage to provide a battery PWM (pulse width modulated) signal having a duty cycle characterized to increase for a sensed isolated output dc voltage having a value less than a predetermined output reference voltage, and decrease for a sensed isolated output dc voltage having a value more than the predetermined output reference voltage, an adaptive converter referenced to the third reference potential node and coupled to the transformer charger winding for charging the battery in response to the first mode selection signal first state and being coupled to receive and being responsive to the battery PWM drive signal to transfer power from the battery to the transformer charger winding to provide the isolated output dc voltage source in response to a mode selection signal second state.

8. The un-interruptible power supply of claim 7 in which the mode control circuit further comprises:

a comparator circuit for sensing the dc input voltage via a resistor divider network, the comparator having a feedback resistor selected to cause the comparator circuit to have a predetermined hysteresis, the comparator circuit outputting the mode selection signal having the first state in response to the dc input voltage exceeding the first voltage level; and the mode selection signal having the second state in response to the dc input voltage passing below the second voltage level; and, a relay responsive to the mode selection signal first state for providing a contact closure.

9. The un-interruptible power supply of claim 7 wherein the high frequency transformer primary winding, the output winding and the charger windings each have respective first and second terminals; and, wherein the input inverter is further characterized to be an H-bridge switching circuit coupled between the dc input voltage node and the first reference potential, the H-Bridge having a left and right branch, each respective branch having a pair of series connected bi-directional semiconductor switching devices, each semiconductor switching device having a bi-directional conduction channel and a control gate, each pair of series connected bi-directional conduction channels being connected at a respective H-bridge output node, each H-Bridge output node being connected to a respective primary winding first and second terminal, each bi-directional semiconductor switching device control gate being coupled to be driven by a high and low side bootstrap peripheral driver, each bootstrap peripheral driver being driven by isolated input PWM signals.

10. The un-interruptible power supply of claim 9 wherein the high and low side bootstrap peripheral drivers driven by isolated input PWM signals are IR2110 peripheral drivers.

11. The un-interruptible power supply of claim 7 in which the a battery inverter control circuit further comprises:

a current sense resistor in series with the load, a first amplifier coupled to sense the voltage across the current sense resistor and convert the current amplitude into a current scaled output voltage, a second amplifier having a first input coupled to sense a portion of the output voltage and a second input coupled to sense a predetermined voltage reference, the second amplifier outputting an amplified difference voltage between the portion of the output voltage and the predetermined reference voltage, and, a third amplifier having a first input coupled to receive the current scaled output voltage of the first amplifier and a second input coupled to receive the amplified difference voltage between the portion of the output voltage and the predetermined reference voltage, the third amplifier outputting a control level voltage, a comparator having a first input coupled to receive a periodic sawtooth voltage wave form each sawtooth having a duration equal to one half of a total switching cycle, and a second input coupled to receive the control level voltage, the output of the comparator being coupled to start a power cycle at the beginning of each sawtooth voltage waveform, the comparator being coupled to reverse its state in response to the sawtooth voltage exceeding the control level voltage, thereby terminating the power cycle in progress.

12. Un-interruptible power supply of claim 7 wherein the adaptive converter further comprises:

an inductor having a first and second terminal, the first terminal being connected to the battery first terminal, and wherein, the high frequency transformer charger winding further comprises:

a first segment having a first number of turns having a first and second terminal for coupling power from the battery first terminal to the output winding, the charger winding having a second segment having additional turns terminating at a third terminal, the total winding from the first to the third terminal being characterized and sized for use in delivering power from the input inverter via the primary winding, via the charger winding, via the closed contact, and via the inductor to charge the battery, the adaptive converter further comprising:

a bridge rectifier circuit having a left and right branch, each branch having a first and second rectifier, each branch of the rectifier circuit having an output end coupled to the inductor second terminal and a return end coupled to the third reference potential, the first and second rectifier of each branch being connected at a respective left and right branch common node, the charger winding first and third terminals being coupled to drive respective bridge rectifier right and left branch common nodes via the mode control circuit contact closure in response to a mode selection signal first state.

13. The Un-interruptible power supply of claim 12 wherein the adaptive converter further comprises:

an H-bridge switching circuit having a left and right branch coupled between the battery first terminal and the third reference potential, each respective branch having a pair of series connected bi-directional semiconductor switching devices, each semiconductor switching device having a bi-directional conduction channel and a control gate, each pair of series connected bi-directional conduction channels being connected at a respective H-bridge output node, each H-Bridge output node being connected to the charger winding first and second terminal, each bi-directional semiconductor switching device control gate being coupled to and driven by a respective high and low side bootstrap peripheral driver, each bootstrap peripheral driver being driven by a respective complementary battery PWM signal pair in response to the mode control signal being in a second state.

14. Un-interruptible power supply of claim 7 wherein the adaptive converter further comprises:

an inductor having a first and second terminal, the first terminal being connected to the battery first terminal, and wherein the high frequency transformer charger winding further comprises:

a first segment having a first number of turns having a first and second terminal for coupling power from the battery first terminal to the output winding, the charger winding having a second segment having additional turns terminating at a third terminal, the total winding from the first to the third terminal being characterized and sized for use in delivering power from the input inverter via the primary winding, via the charger winding, via the closed contact in response to the mode control signal being in the first state, and via the inductor to charge the battery, the adaptive converter further comprising:

a shunt diode, the shunt diode being connected from the battery first terminal to the inductor second terminal to be forward biased in response to current leaving the battery when the mode control signal is in the second state, a bridge rectifier circuit having a left and right branch, each branch having a first and second rectifier, the rectifier circuit having an output end coupled to the inductor second terminal and a return end coupled to the third reference potential, each branch having a first and second rectifier connected at a respective left and right branch common node, the charger winding first and third terminals being coupled to drive respective bridge rectifier left and right branch common nodes via the mode control circuit contact closure in response to a mode selection signal first state.

15. The Un-interruptible power supply of claim 14 wherein the adaptive converter further comprises:

an H-bridge switching circuit coupled between the inductor second terminal and the first reference potential, the H-Bridge having a left and right branch, each respective branch having a pair of series connected bi-directional semiconductor switching devices, each semiconductor switching device having a bi-directional conduction channel and a control gate, each pair of series connected bi-directional conduction channels being connected at a respective H-bridge output node, the left H-Bridge output node being connected to a charger winding first terminal, and the right H-Bridge output node via a closed contact in response to the mode control signal being in a second state to the charger winding second terminal, each bi-directional semiconductor switching device control gate being coupled to be driven by a high and low side bootstrap peripheral driver, each bootstrap peripheral driver being driven by respective complementary battery PWM signals with the mode control signal in a second state in response to the mode selection signal being in a second state.

16. Un-interruptible power supply of claim 7 wherein the adaptive converter further comprises:

an inductor having a first and second terminal, the first terminal being connected to the battery first terminal, the high frequency transformer charger winding further comprises:

a center-tapped segment having two end terminals and a center tapped terminal for coupling power from the battery first terminal to the output winding, the charger winding having a second and third segment, each second and third segment having substantially equivalent turns counts and having a first and second terminal, the first terminal of each respective second and third segment being coupled to a respective center-tapped segment end terminal, the second terminal of each center-tapped second and third segment being connected to a respective first and second battery charge diode, each respective battery charge diodes being connected through a contact closure as the mode control signal assumes a first state to the inductor second terminal, the battery charge diodes forming a full wave rectifier, the center taped node being connected to the third reference potential, the combination of the center taped segment and the second and third segments being sized to drive the full wave rectifier formed by the two battery charge diodes to deliver power from the input inverter via the primary winding, via the charger winding, via the contact closure, and via the inductor to charge the battery, the adaptive converter further comprising:

a full wave synchronous bi-directional rectifier circuit having a left and right branch, each branch having a semiconductor switching device having a conduction channel and a control gate, each conduction channel having a first and second terminal, the left and right branch conduction channel first ends being connected to the inductor first end, the left and right branch conduction channel second ends being connected to respective charger winding center tapped segment ends, a freewheeling rectifier circuit having an output end coupled to the inductor second terminal and a return end coupled to the third reference potential.

17. The un-interruptible power supply of claim 7 wherein the high frequency transformer is further characterized to have its primary winding, output winding and charger winding isolated from each other.

18. The un-interruptible power supply of claim 7 further comprising:

a micro-controller coupled via signal paths to communicate data and control signals for the control or performance of at least one of the functions selected from the group of functions including, mode control, input inverter control, battery inverter control, and or an external interface control.

* * * * *